(12) United States Patent
Maertens (10) Patent No.: US 7,878,537 B2
(45) Date of Patent: Feb. 1, 2011

(54) AIRBAG CUSHION

(75) Inventor: Paul G. Maertens, Highland, MI (US)

(73) Assignee: TK Holdings Inc., Auburn Hills, MI (US)

( * ) Notice: Subject to any disclaimer, the term of this patent is extended or adjusted under 35 U.S.C. 154(b) by 294 days.

(21) Appl. No.: 12/010,211

(22) Filed: Jan. 22, 2008

(65) Prior Publication Data

US 2008/0179866 A1    Jul. 31, 2008

Related U.S. Application Data

(63) Continuation-in-part of application No. 11/523,810, filed on Sep. 20, 2006.

(60) Provisional application No. 60/881,183, filed on Jan. 19, 2007.

(51) Int. Cl.
*B60R 21/276* (2006.01)

(52) U.S. Cl. ................... 280/739; 280/743.2

(58) Field of Classification Search ......... 280/739, 280/742, 743.1, 743.2
See application file for complete search history.

(56) References Cited

U.S. PATENT DOCUMENTS

| | | | |
|---|---|---|---|
| 5,213,361 A | 5/1993 | Satoh et al. | |
| 5,280,953 A | 1/1994 | Wolanin et al. | |
| 5,405,166 A | 4/1995 | Rogerson | |
| 5,468,013 A | 11/1995 | Gille | |
| 5,501,488 A | 3/1996 | Saderholm et al. | |
| 5,513,879 A | 5/1996 | Patel et al. | |
| 5,603,526 A | 2/1997 | Buchanan | |
| 5,704,639 A | 1/1998 | Cundill et al. | |
| 5,853,191 A | 12/1998 | Lachat | |
| 5,931,497 A | 8/1999 | Fischer | |
| 6,139,052 A | 10/2000 | Preamprasitchai | |
| 6,247,726 B1 | 6/2001 | Ryan | |
| 6,308,983 B1 | 10/2001 | Sinnhuber | |
| 6,659,499 B2 | 12/2003 | Jenkins | |
| 6,669,231 B2 | 12/2003 | Ryan | |
| 6,746,045 B2 | 6/2004 | Short et al. | |
| 6,773,030 B2 | 8/2004 | Fischer | |
| 6,799,777 B2 | 10/2004 | Hawthorn et al. | |
| 6,830,265 B2 | 12/2004 | Ford | |
| 6,832,778 B2 | 12/2004 | Pinsenschaum et al. | |
| 6,834,886 B2 | 12/2004 | Hasebe et al. | |
| 6,869,101 B2 | 3/2005 | White et al. | |
| 6,918,613 B2 | 7/2005 | Short et al. | |
| 6,932,385 B2 | 8/2005 | Hawthorn et al. | |

(Continued)

FOREIGN PATENT DOCUMENTS

JP        09-142239        3/1997

(Continued)

*Primary Examiner*—Paul N Dickson
*Assistant Examiner*—Joseph Rocca
(74) *Attorney, Agent, or Firm*—Foley & Lardner LLP (57) ABSTRACT

An airbag with a venting assembly. An airbag can include a panel with at least one vent opening and a valve sheet with at least one vent opening and at least one tear tab. The panel and valve sheet can be arranged so that the vent openings of the panel and the vent openings of the valve sheet are configured to align with one another for a period of time during deployment of the airbag. The tear tabs can be configured to break during deployment of the airbag.

19 Claims, 7 Drawing Sheets

U.S. PATENT DOCUMENTS

| | | |
|---|---|---|
| 6,945,559 B2 | 9/2005 | Kassman et al. |
| 6,959,945 B2 | 11/2005 | Fischer et al. |
| 7,000,943 B2 | 2/2006 | Hasebe et al. |
| 7,261,319 B2 * | 8/2007 | DePottey et al. ............ 280/739 |
| 7,264,268 B2 * | 9/2007 | Ehrke ........................ 280/729 |
| 2001/0033072 A1 | 10/2001 | Kumagai et al. |
| 2003/0218325 A1 | 11/2003 | Hasebe et al. |
| 2004/0051285 A1 | 3/2004 | Fischer |
| 2004/0051286 A1 | 3/2004 | Fischer et al. |
| 2004/0056459 A1 | 3/2004 | Kassman et al. |
| 2004/0145160 A1 | 7/2004 | Hasebe et al. |
| 2004/0145161 A1 | 7/2004 | Hasebe et al. |
| 2004/0155439 A1 | 8/2004 | Hasebe et al. |
| 2004/0155440 A1 | 8/2004 | Hasebe et al. |
| 2004/0155443 A1 | 8/2004 | Ford |
| 2004/0160041 A1 | 8/2004 | Hasebe et al. |
| 2004/0188990 A1 | 9/2004 | Short et al. |
| 2005/0029781 A1 | 2/2005 | Enders et al. |
| 2005/0040634 A1 | 2/2005 | Braun et al. |
| 2005/0040635 A1 | 2/2005 | Hawthorn et al. |
| 2005/0098990 A1 | 5/2005 | Pinsenschaum et al. |
| 2005/0104339 A1 | 5/2005 | Hasebe et al. |
| 2005/0110249 A1 | 5/2005 | Hasebe et al. |
| 2005/0127648 A1 | 6/2005 | Fischer et al. |
| 2005/0146122 A1 | 7/2005 | Gould et al. |
| 2005/0161918 A1 | 7/2005 | Bito |
| 2005/0184489 A1 | 8/2005 | Kobayashi |
| 2005/0194769 A1 | 9/2005 | Abe |
| 2005/0236822 A1 | 10/2005 | Rose et al. |
| 2005/0248137 A1 | 11/2005 | Delventhal et al. |
| 2006/0151979 A1 * | 7/2006 | DePottey et al. ............ 280/739 |

FOREIGN PATENT DOCUMENTS

| | | |
|---|---|---|
| JP | 2005-014861 | 1/2005 |
| JP | 2005-014862 | 1/2005 |
| JP | 2005-014863 | 1/2005 |
| JP | 2005-014864 | 1/2005 |

* cited by examiner

AIRBAG CUSHION

CROSS-REFERENCE TO RELATED PATENT APPLICATIONS

This application claims priority to U.S. Provisional Application 60/881,183, filed Jan. 19, 2007, and is also a Continuation-in-Part of U.S. application Ser. No. 11/523,810, filed Sep. 20, 2006. Both of the foregoing applications are hereby incorporated by reference in their entireties.

BACKGROUND

The application relates to an airbag with a venting assembly. More specifically, the application relates to an airbag including a passive venting system.

Airbags may include venting assemblies to release inflation fluid out of the airbag. Generally, venting assemblies are located in the airbag housing adjacent the inflator.

Some airbag systems utilize active sensor and/or control systems to control the deployment of the airbag during an accident involving a rear facing infant seat (RFIS) or out-of-position (OOP) occupant that will minimize potential injuries to occupants from the airbag itself. Such electronic sensor and control systems can be expensive and, more significantly, the complexity of the sensor and control systems may make high reliability difficult to achieve in some circumstances. These conventional active type assemblies may also require a significant amount of space in an airbag system.

Passive venting systems are an alternative to active venting systems. Passive venting systems operate to vent gas from the airbag during deployment of the airbag and do not require a specific trigger or activation. Passive venting systems may be advantageous because they do not require costly equipment to manufacture or install. Passive venting systems are advantageous because the passive venting mechanism is generally simpler than the electronic control system typically used in active venting systems. A passive venting mechanism may be more reliable than an electronic control system.

BRIEF DESCRIPTION OF THE DRAWINGS

Features, aspects, and advantages of the present invention will become apparent from the following description, appended claims, and the accompanying exemplary embodiments shown in the drawings, which are briefly described below.

DESCRIPTION

According to an exemplary embodiment, an occupant protection apparatus is provided. The apparatus includes an inflatable airbag including a panel. The panel includes a first vent opening through which inflation fluid may escape out of the airbag. The apparatus also includes a moveable valve sheet overlying the first vent opening and including a second vent opening movable relative to the first vent opening. The valve sheet is fixed to a surface of the panel at opposite ends. A valve guide is provided to guide movement of the valve sheet relative to the panel. The valve sheet is configured to slide between the valve guide and the panel. One end of the valve sheet moves with the panel during inflation of the airbag to move the second vent opening relative to the first vent opening. The first and a second end of the valve sheet are fixed to the panel during and after inflation of the airbag. The valve sheet includes at least one breakaway tab to attach the valve sheet to the fabric panel prior to and during inflation of the airbag, the breakaway tab configured to break apart and allow the valve sheet to move during inflation of the airbag to move the second vent opening relative to the first vent opening.

According to a disclosed embodiment, an airbag with a venting assembly includes a cushion panel with at least one vent opening and a valve sheet with at least one vent opening and at least one tear tab. Each tear tab is attached to the panel, and the vent openings of the panel and the vent openings of the valve sheet are configured to align with one another at least for a period of time during deployment of the airbag. The tear tabs are configured to break if the airbag does not come into contact with an object or a vehicle occupant during deployment of the airbag.

According to yet another embodiment, the breakaway tab may be sewn to the panel of the airbag. In an alternative embodiment, the breakaway tab may have a substantially hourglass shape.

In an embodiment, the tear tab comprises slits such that fibers of the tear tab adjacent the slit are discontinuous.

According to another embodiment, the tear tab comprises slits that are cut at approximately a 45 degree angle to an imaginary line extending from a lengthwise side edge of the tab. Alternatively, the slit may be cut at approximately a 45 degree angle from a line extending from a lengthwise side edge of an elongated vent in the valve sheet.

In yet another embodiment, the tear tab is located at a distal end of the valve sheet. In yet another embodiment, a pocket encloses the valve sheet and tear tabs.

Figure 1:
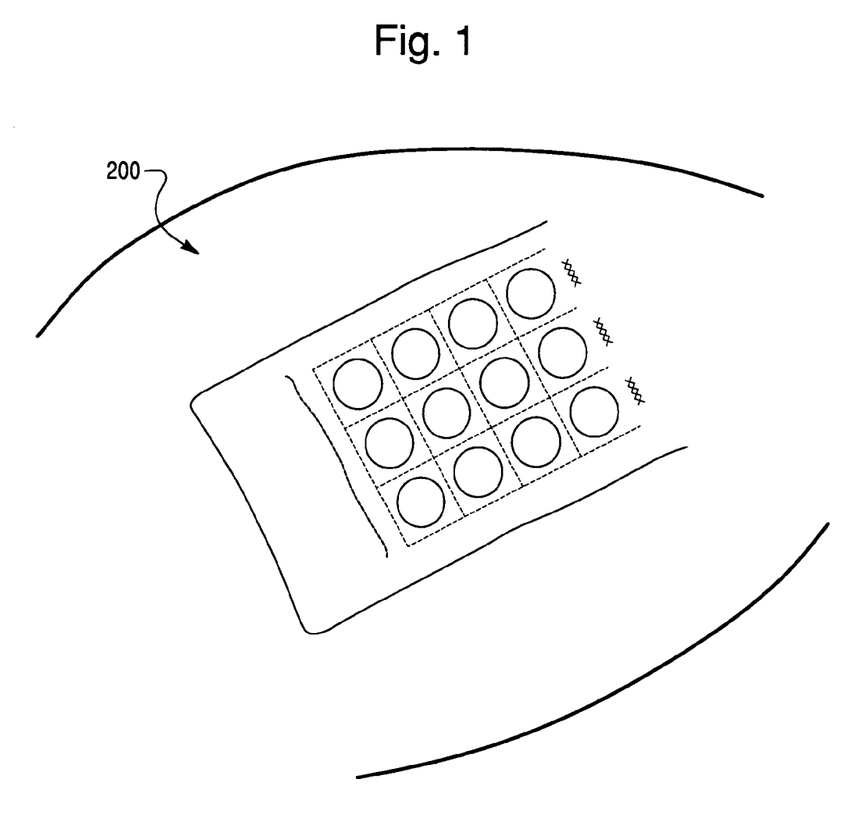
FIG. 1 is a perspective view of an airbag and a passive vent assembly according to an embodiment.

FIG. 1 is a perspective view of an exemplary airbag cushion 200 including a passive venting system. In the disclosed passive venting system, the airbag cushion vents remain open during initial inflation and close as the cushion proceeds closer to a fully deployed state. The passive venting system permits operation of the airbag vents without the use of complicated or costly electronic or active controls. During deployment, if (prior to full deployment) the airbag contacts an out of position occupant or some other object located in the seat, the airbag is configured so that the inflation gases are allowed to escape to minimize possible injury to the vehicle occupants. For example, the airbag vents would remain open if the occupant is out of position and located close to the airbag storage location. However, if the airbag is not obstructed during deployment, the airbag is allowed to fully deploy and inflate. When the airbag fully deploys, the airbag vents close.

Figure 2:
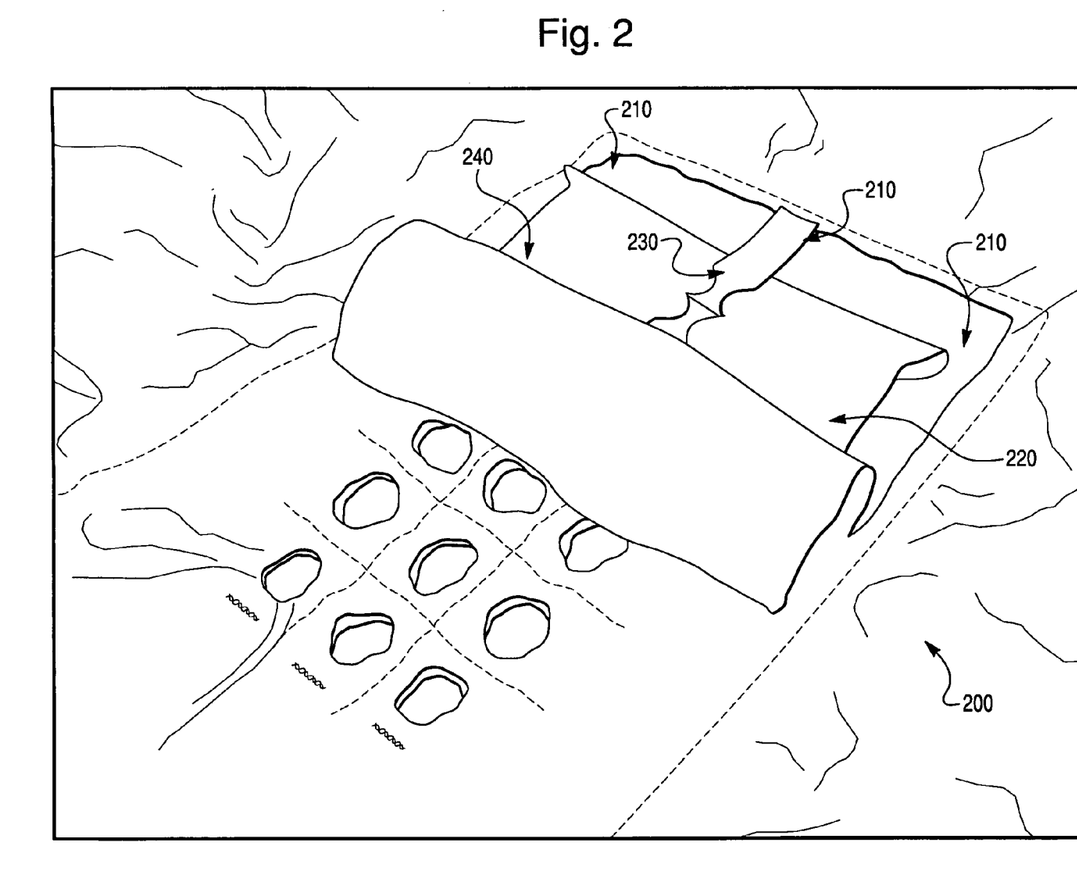
FIG. 2 is a perspective view of a vent assembly with tear tabs attached to an inner fabric surface of an airbag according to an embodiment, in which a pocket is partially removed and folded to reveal the tear tabs and valve sheet of the vent assembly.

FIG. 2 illustrates an embodiment of an airbag cushion 200 utilizing passive venting technology. A passive vent valve assembly is shown which includes exaggerated hourglass shaped tear tabs 210, an extension based dual tether 220 with both vertical 230 and horizontal 240 components, and a pocket 140 which encloses the passive vents and the valve tether(s). The pocket 140 can either completely or partially enclose the vent holes 110, 120 and valve tether 220. In the embodiment shown in FIGS. 2 and 4, the pocket 140 has been detached and folded back to reveal tabs 230.

Figure 3:
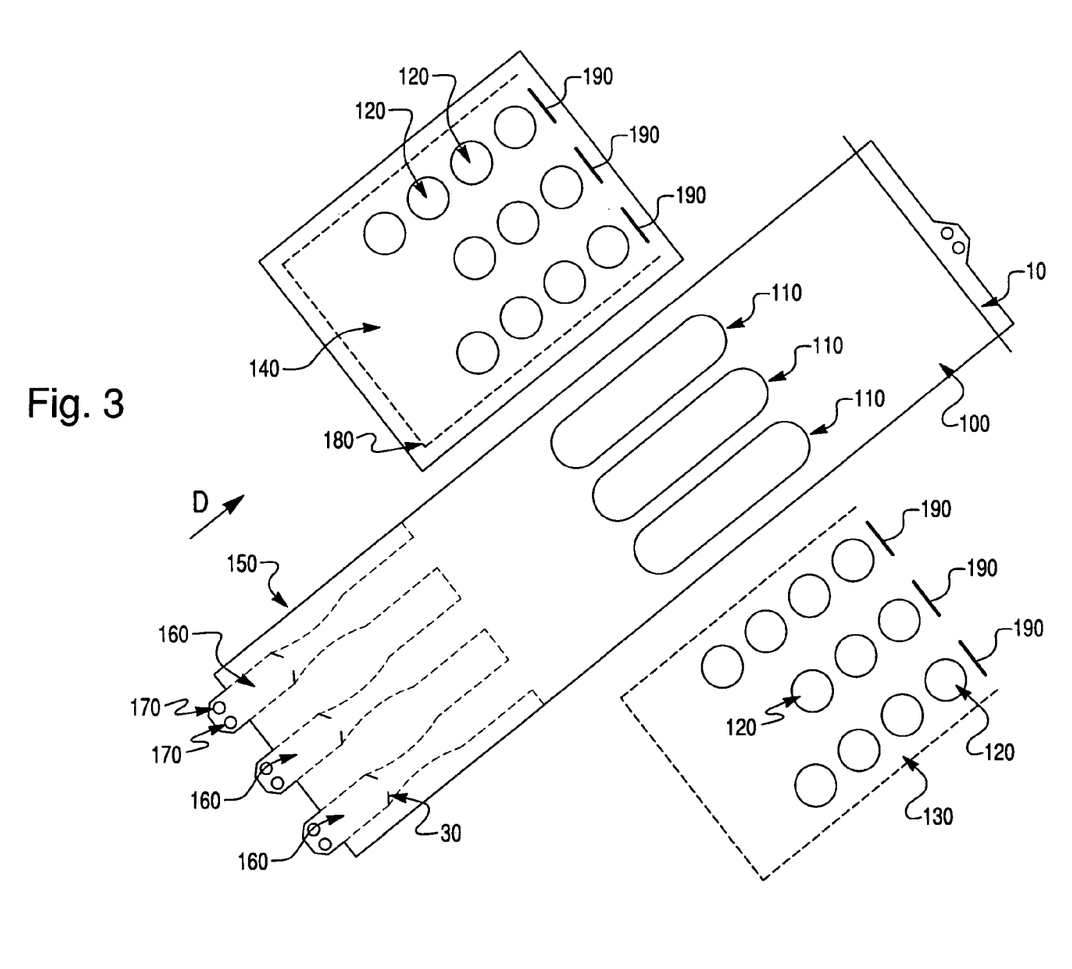
FIG. 3 is an exploded view of a vent assembly illustrating an inner surface of the airbag, a valve sheet prior to being folded, and a pocket, according to an embodiment.
Figure 4:
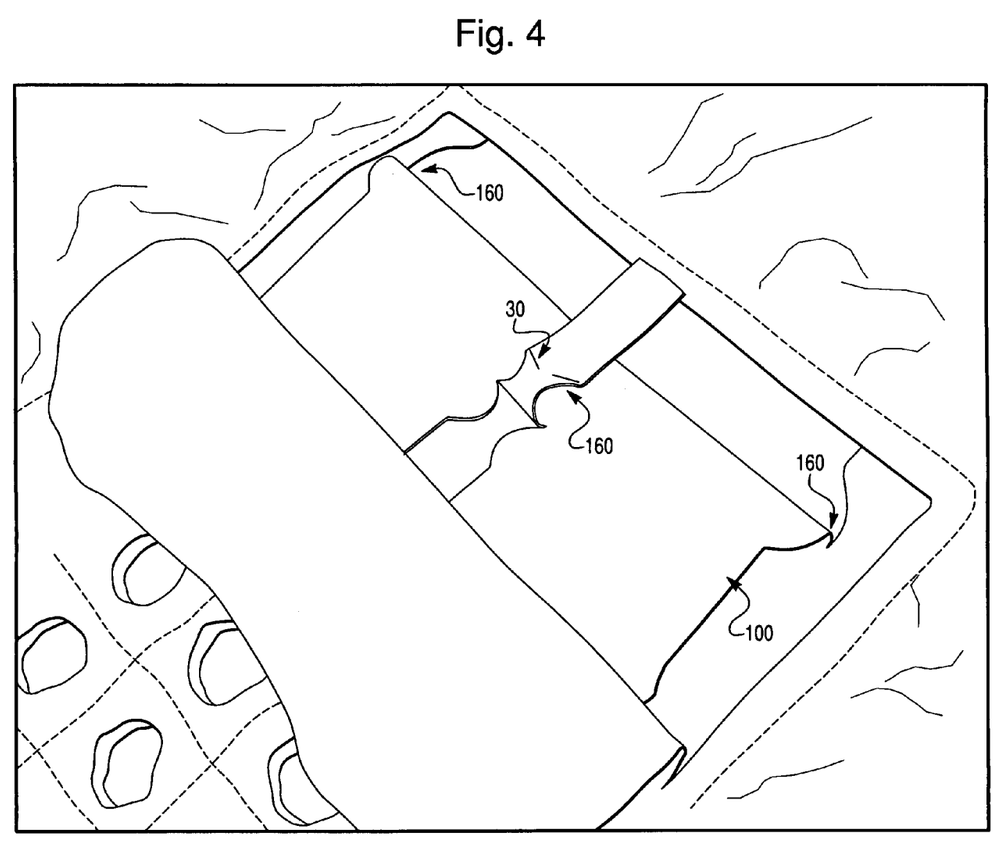
FIG. 4 is a detail perspective view of the vent assembly of FIG. 2.

Details of the airbag vent valve arrangement may be seen in FIG. 3 and FIG. 4. One continuous sheet 100 of fabric includes a valve sheet 150 that covers the vent holes 110, 120. At one end, the sheet 100 is attached by stitching 10 to the inside of the airbag cushion 200. The attachment creates a tether to the airbag cushion 200 so that when deployment occurs the sheet moves with the airbag cushion. The opposite end of the valve sheet 150 is also attached to the inside of the airbag cushion 200, preferably by stitching. The valve sheet 100, 150 is folded so that elongated vents 110 occurring along the sheet 100, 150 are aligned with circular vents holes 120 on both the pocket 140 and on the main body of the airbag 200.

Figure 5:
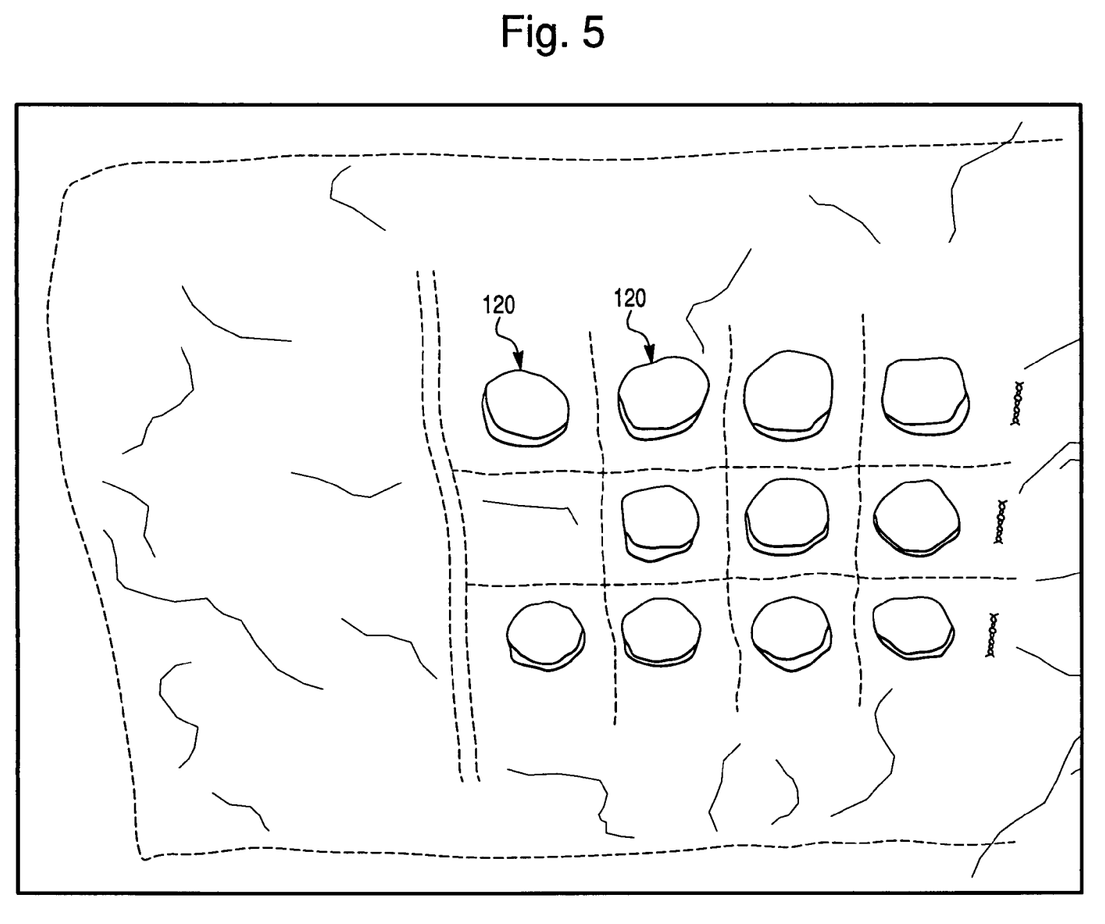
FIG. 5 is a view of an open valve of the vent assembly in FIG. 2.
Figure 6:
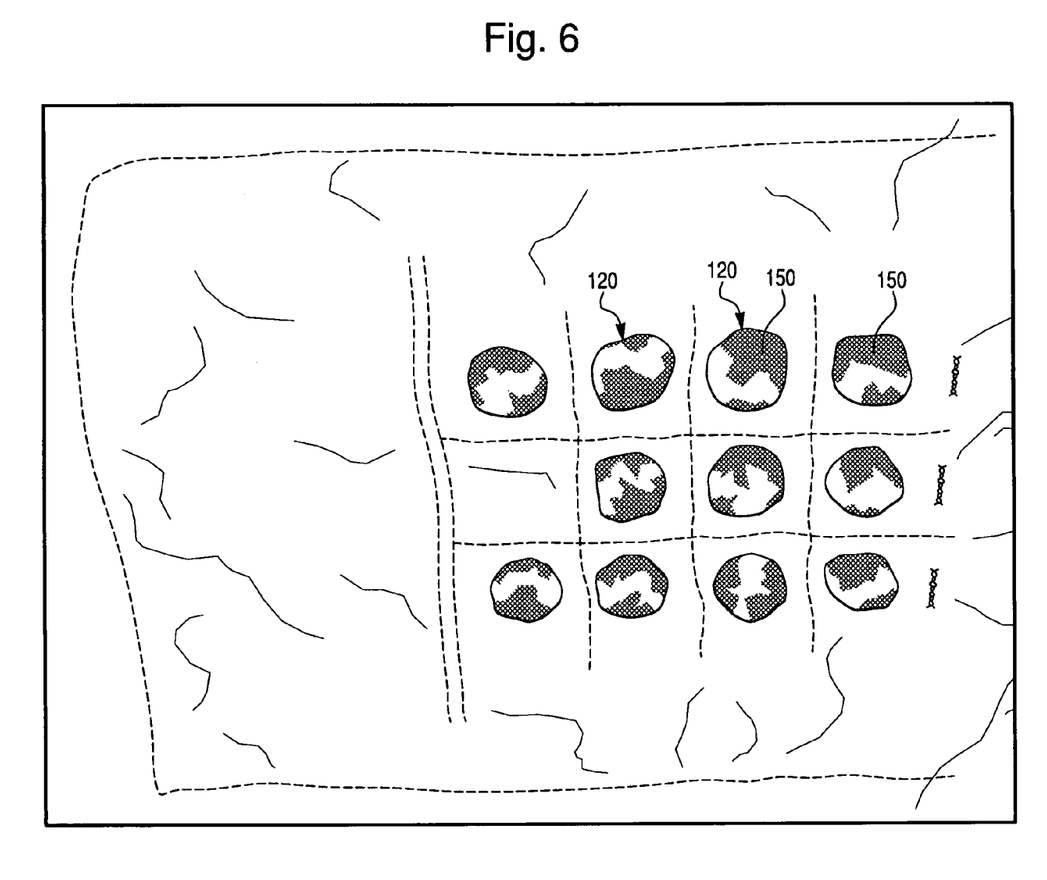
FIG. 6 is a view of a closed valve of the vent assembly in FIG. 2.

The elongated vent holes 110 are configured to align with the circular vents 120 incorporated within the airbag. Further, the pocket 140 also includes circular vent openings 120 that align with the vent holes 110 in the fabric sheet 150 and the airbag vents 120. When the airbag 200 initially inflates, gases can escape the airbag 200 through the circular pocket vents 120, elongated vents 110, and circular airbag vents 120. FIG. 5 illustrates the vent valve in an open position. When the airbag 200 fully deploys, the valve sheet 150 is pulled tight to cover the vent holes and gases can no longer escape the airbag through the venting system. The valve sheet 150 moves to a position over the circular airbag vents 120 and the circular pocket vents 120 as illustrated in FIG. 6.

The valve sheet 150 can include approximately hourglass shaped tear tabs 160. Tear tabs 160 may be made out of any suitable material for an airbag. For example, the tear tabs 160 may be cut from the continuous portion of the valve sheet 150 as illustrated in FIG. 4 so that the tear tabs 160 and the valve sheet 150 have a one-piece construction. Alternatively, the tear tabs 160 and the valve sheet 150 may be separate pieces. The tear tabs 160 are stitched in place and attached to the inside of the airbag cushion 200. Additionally, the tabs 160 may include slits 30 that are cut at approximately a 45 degree angle to an imaginary line extending from a lengthwise side edge of the tab 160. Alternatively, the slit 30 may be cut at approximately a 45 degree angle from a line extending from a lengthwise side edge of an elongated vent hole 110 in the valve sheet 150. This approximately 45 degree angle allows for the optimum performance of the tear tabs 160. Alternatively, the slits 30 may be cut at any other suitable angle.

At a distal end, the tear tabs 160 can include small holes 170. These holes 170 locate the tear tabs 160 with the appropriate section of the airbag cushion 200 to which the tear tabs 160 should be attached. The holes 170 can therefore simplify the manufacturing process assisting in locating and sewing of the tabs 160.

The valve sheet 100 may be enclosed by another sheet of fabric 140 that is placed over the folded valve assembly, thus creating a pocket 140. The pocket 140 is attached to the airbag 200 with stitches 180. For example, the stitches 180 can form an approximate "C" shape along three side edges of the pocket 140.

Inflation gases from an inflator (not shown) inflate the cushion 200. If the airbag 200 does not come in contact with an out of position occupant or another object, the airbag 200 is allowed to fully inflate. The airbag cushion 200 then unfolds, causing the valve sheet 150 of the cushion 200 to tear away at the hourglass shaped tear tabs 160. Upon breakage of the tear tabs 160, the valve sheet 150 releases and the valve sheet 150 travels accordingly to the area(s) of cushion 200 excursion, thus ensuring closure of the vent holes 120 in the airbag. For example, the valve sheet 150 can travel or fold in the direction indicated by arrow D in FIG. 3 upon breakage of tear tabs 160. The vent holes 120 in the airbag are closed when the valve sheet 150 moves, thus ending the alignment of the elongated holes 110 with the airbag cushion 200 holes 120. Should the airbag 200 come in contact with an out of position occupant or another object, complete inflation of the airbag 200 is prohibited. In this case, the valve sheet 150 and tear tabs 160 may remain intact thus allowing the vent holes 120 to remain open and further allowing inflation gas to escape from the airbag. Prior to the tearing of the tags 160, the elongated holes 110 are aligned with the vent holes 120 in both the pocket 140 and the airbag cushion 200. The tear tabs provide for reduced variability and more reliable in operation of the passive venting value mechanism.

Figure 7:
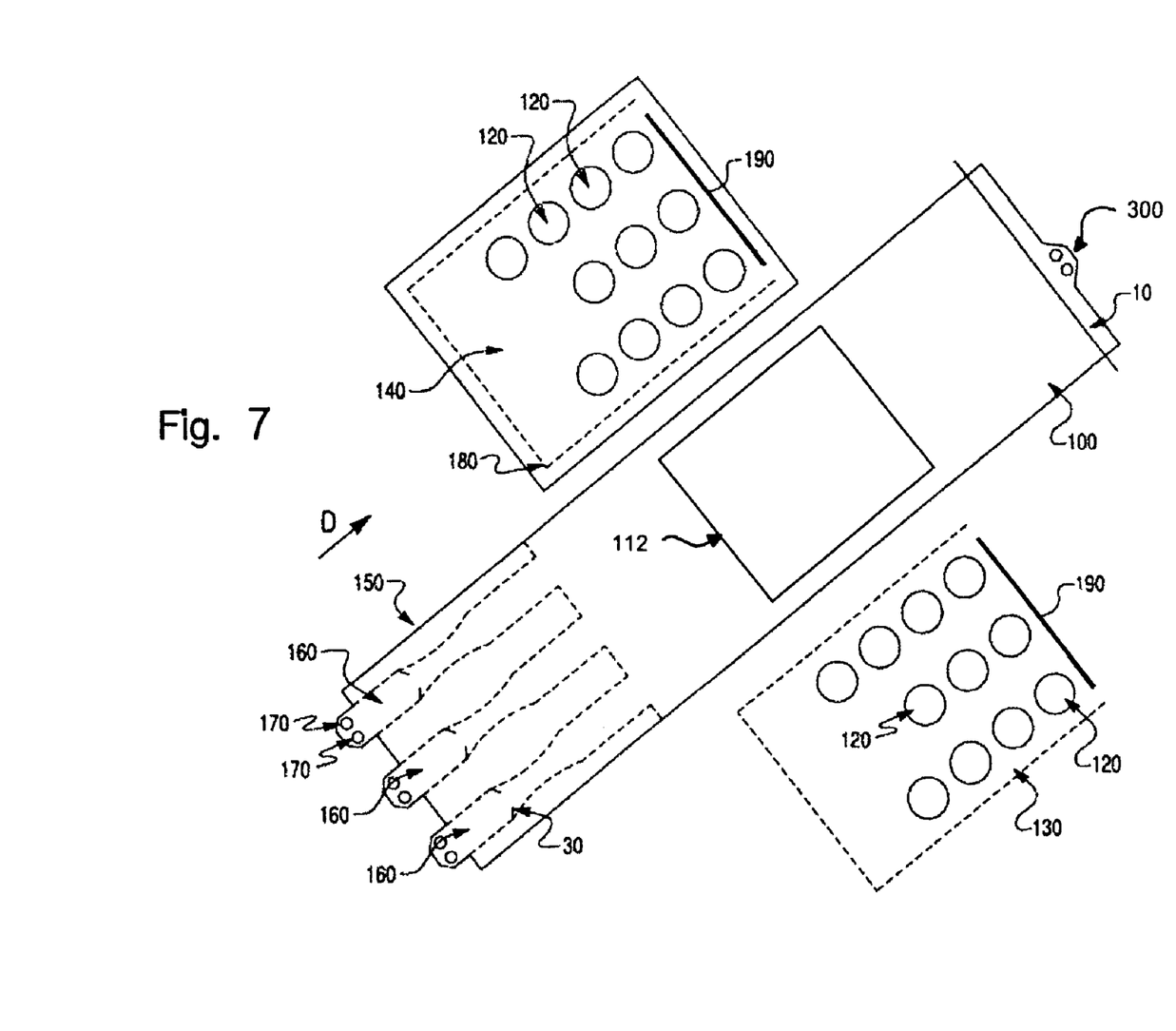
FIG. 7 is an exploded view of a vent assembly illustrating an inner surface of the airbag, a valve sheet prior to being folded, and a pocket, according to an embodiment.

During airbag deployment, passive venting valve assemblies may flutter and/or flap as the internal pressure of the airbag 200 increases. Inflation gas may enter the pocket 140 and disrupt operation and movement of the valve sheet 150. Enclosing or partially enclosing the valve sheet 150 within the pocket 140 controls this fluttering of the valve sheet 150 during deployment and reduces the effect of gas flow dynamics on the time for the vent valve to close. Referring back to FIG. 3, travel of the valve sheet 150 is controlled and limited by stitches 190. According to an embodiment, stitches 190 can be located between the slotted openings 110 of the valve sheet 150, such as in discontinuous lines, as shown in the example of FIG. 3. According to another embodiment, stitches 190 can be formed in a continuous line across the valve sheet 150, as shown in the example of FIG. 7. In the latter embodiment, the valve sheet 150 could have a single large opening 112, as shown in the example of FIG. 7.

The use of stitches 190 to partially close the open end of the pocket can advantageously reduce the amount of inflation gases that enter the pocket 140. Thus, the use of stitches 190 according to the previous embodiments can minimize fluttering of the valve assembly, improve the sealing of the vent holes 120 during the deployment event, control the side to side movement of the valve assembly during deployment of the airbag 200, and control the amount of downward extension of the valve tether slots 110 during deployment.

In consideration of the design of the vent assembly, the width of the hourglass tear tabs 160 may be varied to accommodate various breaking forces. Increasing the width of the tear tab 160 would require a greater force to sever the tear tabs from the valve sheet 150. Similarly, decreasing the width of the tear tabs would allow for a lower force to be used to cause breakage of the tear tabs.

An attachment point 300 of the valve assembly to an airbag 200 can be designed to facilitate the venting of an airbag 200. For example, an attachment point 200 can be formed at the end of a valve sheet 150, such as in the example of FIG. 7. Such an attachment point 300 can be located at an end of the valve sheet 150 opposite to tear tabs 160. For example, the attachment point 300 can be attached to an airbag 200 so that the attachment point 300 is located at a point on the airbag 200 that travels the greatest distance during deployment of the airbag 200. Because the attachment point 300 is located at a relatively remote point on the airbag, the valve sheet 150 is reliably pulled taught as the airbag 200 expands during deployment. In another example, the attachment point 300 can be located on a portion of the airbag 200 that is designed to face a passenger in a vehicle.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An airbag for protecting an occupant of a vehicle, the airbag comprising:
   a cushion panel with a first vent opening; and
   a valve sheet with a second vent opening and at least one tear tab, wherein each tear tab is attached to the panel;
   wherein the first and second vent openings are configured to align with one another at least for a period of time during deployment of the airbag;
   wherein the tear tab is configured to tear away from valve sheet when the airbag deploys to a fully inflated unobstructed position;
   wherein the at least one tear tab forms a connection between an end of the valve sheet and the cushion panel.

2. The airbag of claim 1, wherein the valve sheet and panel are configured to move relative to one another during deployment of the airbag so that the first and second vent openings move relative to one another.

3. The airbag of claim 1, wherein the valve sheet is configured to close the first vent opening of the panel if the airbag deploys without contacting an object or the occupant.

4. The airbag of claim 1, wherein the tear tab is located at one end of the valve sheet, wherein the valve sheet is fixed to the panel at an end of the valve sheet opposite to the tear tab.

5. The airbag of claim 1, wherein the second vent opening is elongated in a lengthwise direction of the valve sheet.

6. The airbag of claim 1, further comprising a valve guide that is configured to guide movement of the valve sheet relative to the panel.

7. The airbag of claim 6, wherein the valve sheet is configured to slide between the valve guide and the panel.

8. The airbag of claim 6, wherein the valve sheet is at least partially enclosed by the valve guide and the panel.

9. The airbag of claim 6, wherein the valve guide is a fabric pocket that is attached to the panel so that the valve sheet is located between the fabric pocket and the valve panel, wherein the valve sheet is configured to slide between the valve guide and the panel, wherein the fabric pocket includes at least one vent opening.

10. The airbag of claim 9, wherein the fabric pocket is sewn with stitches to the panel.

11. The airbag of claim 10, wherein the stitches are formed in a continuous line across a width of the valve sheet.

12. The airbag of claim 10, wherein the valve sheet comprises a plurality of vent openings, wherein the stitches comprise a plurality of discontinuous lines of stitches arranged between the vent openings of the valve sheet.

13. The airbag of claim 10, wherein the stitches comprise stitches sewn in a C pattern along three sides of the fabric pocket and stitches arranged on a fourth side of the fabric pocket.

14. The airbag of claim 1, wherein the tear tab includes at least one slit.

15. The airbag of claim 14, wherein the slit is at an approximately 45 degree angle to an imaginary line extending from a lengthwise side edge of the tear tab.

16. The airbag of claim 14, wherein the slit is at an approximately 45 degree angle from a line extending from a lengthwise side edge of the vent opening in the valve sheet.

17. The airbag of claim 1, wherein the tear tab has an hourglass shape.

18. The airbag of claim 1, wherein the tear tab includes at least one locating hole.

19. The airbag of claim 1, wherein the at least one tear tab forms the connection such that when the at least one tear tab tears the end of the of the valve sheet is no longer directly connected to the cushion panel.

* * * * *